(12) United States Patent
Naish et al.

(10) Patent No.: US 12,325,294 B2
(45) Date of Patent: Jun. 10, 2025

(54) TRANSPORTABLE ENCLOSURE WITH ROTARY DOOR

(71) Applicants: MAGNA INTERNATIONAL INC., Aurora (CA); Adam Naish, Rocester, MI (US); Warren Young, Troy, MI (US)

(72) Inventors: Adam Naish, Rocester, MI (US); Warren Young, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 221 days.

(21) Appl. No.: 17/795,419

(22) PCT Filed: Jan. 29, 2021

(86) PCT No.: PCT/US2021/015621
§ 371 (c)(1),
(2) Date: Jul. 26, 2022

(87) PCT Pub. No.: WO2021/155093
PCT Pub. Date: Aug. 5, 2021

(65) Prior Publication Data
US 2023/0062564 A1    Mar. 2, 2023

Related U.S. Application Data

(60) Provisional application No. 62/967,899, filed on Jan. 30, 2020.

(51) Int. Cl.
*B60J 5/04*     (2006.01)
*B62D 63/02*    (2006.01)

(52) U.S. Cl.
CPC ............ *B60J 5/047* (2013.01); *B60J 5/048* (2013.01); *B60J 5/0497* (2013.01); *B62D 63/025* (2013.01)

(58) Field of Classification Search
CPC . B60J 5/047; B60J 5/048; B60J 5/0497; B60J 5/062; B60J 5/065; B60J 5/08; B62D 31/025; B62D 63/025
(Continued)

(56) References Cited

U.S. PATENT DOCUMENTS 1,611,013 A    12/1926  Francke
3,677,197 A    7/1972   Hounshell et al.
(Continued)

FOREIGN PATENT DOCUMENTS

EP    0047659 A2    3/1982
GB    2579068 A     6/2020
(Continued)

OTHER PUBLICATIONS

Supplementary European Search Report regarding corresponding EP App. No. 21 74 8447; issued Jan. 23, 2024.

*Primary Examiner* — Jason S Morrow
(74) *Attorney, Agent, or Firm* — Dickinson Wright PLLC

(57) ABSTRACT

A transportable enclosure comprises a sheet of flexible material defining a closed loop, with the sheet defining an opening therethrough. The closed loop of the sheet is configured to be rotated by an actuator for selectively aligning the opening with an access position, such as a port in a side panel of a housing, for loading or unloading cargo from the interior space. A drive pulley is coupled to the actuator for rotating the sheet, and a belt extends along the closed loop to engage the drive pulley. The actuator may be located within the transportable enclosure or outside of the transportable enclosure. One or more guides are configured to hold the closed loop of the sheet outwardly while allowing the sheet to rotate. The transportable enclosure may be used with a ground or an aerial vehicle, which may be a vehicle configured for unmanned and/or autonomous operation.

20 Claims, 19 Drawing Sheets

(58) Field of Classification Search
USPC .................................................. 296/193.04
See application file for complete search history.

(56) References Cited

U.S. PATENT DOCUMENTS

| | | | |
|---|---|---|---|
| 4,753,343 A | 6/1988 | Flynn | |
| 4,941,570 A | 7/1990 | Kruger et al. | |
| 5,044,689 A * | 9/1991 | Evers | B60J 5/065 |
| | | | 220/9.1 |
| 5,320,402 A * | 6/1994 | Evers | B60J 5/065 |
| | | | 220/1.5 |
| 9,156,336 B2 * | 10/2015 | Fennell | B60J 5/08 |
| 2018/0326886 A1 | 11/2018 | Sibley | |
| 2024/0092153 A1 * | 3/2024 | Ferrari | E05D 15/02 |

FOREIGN PATENT DOCUMENTS

| | | |
|---|---|---|
| WO | 199854723 A1 | 12/1998 |
| WO | 2019020407 A1 | 1/2019 |

\* cited by examiner

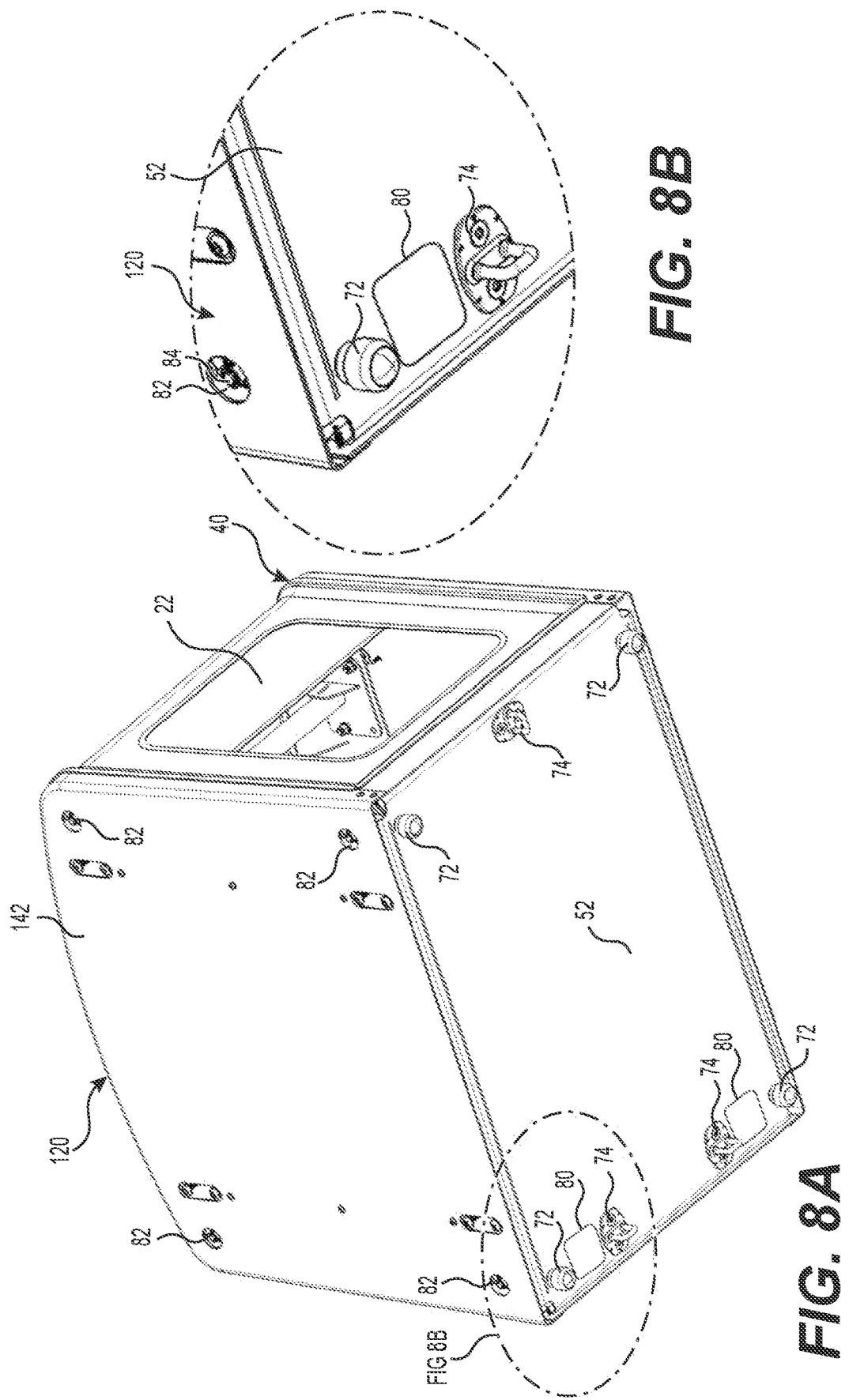

TRANSPORTABLE ENCLOSURE WITH ROTARY DOOR

CROSS-REFERENCE TO RELATED APPLICATIONS

This U.S. National Stage Patent Application claims the benefit of PCT International Patent Application Serial No. PCT/US2021/015621 filed Jan. 29, 2021 entitled "TRANSPORTABLE ENCLOSURE WITH ROTARY DOOR" which claims the benefit of U.S. Provisional Patent Application Ser. No. 62/967,899 filed on Jan. 30, 2020, and titled "Rotary Door For Delivery Vehicle", the entire disclosures of which are hereby incorporated by reference.

FIELD

The present disclosure relates generally to transportable enclosures. More specifically, the disclosure relates to a transportable enclosure with a door of flexible material formed as a closed loop.

BACKGROUND

Almost every type of transportable enclosure includes some type of door to provide access to an interior space. Several different types of doors may be used on delivery vehicles to secure cargo and to provide access to the cargo for loading and unloading. Special considerations may be required for unmanned vehicles, also called bots, to provide security and reliability, since a person may not be available to troubleshoot issues. Additional considerations, such as weight may be required for aerial vehicles, especially unmanned aerial vehicles, which may also be called drones.

When delivering small packages, such as containers of food, using an autonomous vehicle, a door may be used to keep packages secure in transit while quickly being able to release a package once at destination and recipient has been verified.

SUMMARY

The present disclosure provides a transportable enclosure. The transportable enclosure comprises a sheet of flexible material defining a closed loop surrounding an interior space, with the sheet defining an opening therethrough. The closed loop of the sheet is configured to be rotated by an actuator for selectively aligning the opening with an access position for loading or unloading cargo from the interior space through the opening.

BRIEF DESCRIPTION OF THE DRAWINGS

Further details, features and advantages of designs of the invention result from the following description of embodiment examples in reference to the associated drawings.

FIG. 8A shows a perspective bottom view of a transportable enclosure in accordance with some embodiments of the present disclosure;

FIG. 8B shows an enlarged section of the perspective bottom view of the transportable enclosure of FIG. 8A;

DETAILED DESCRIPTION

Figure 1:
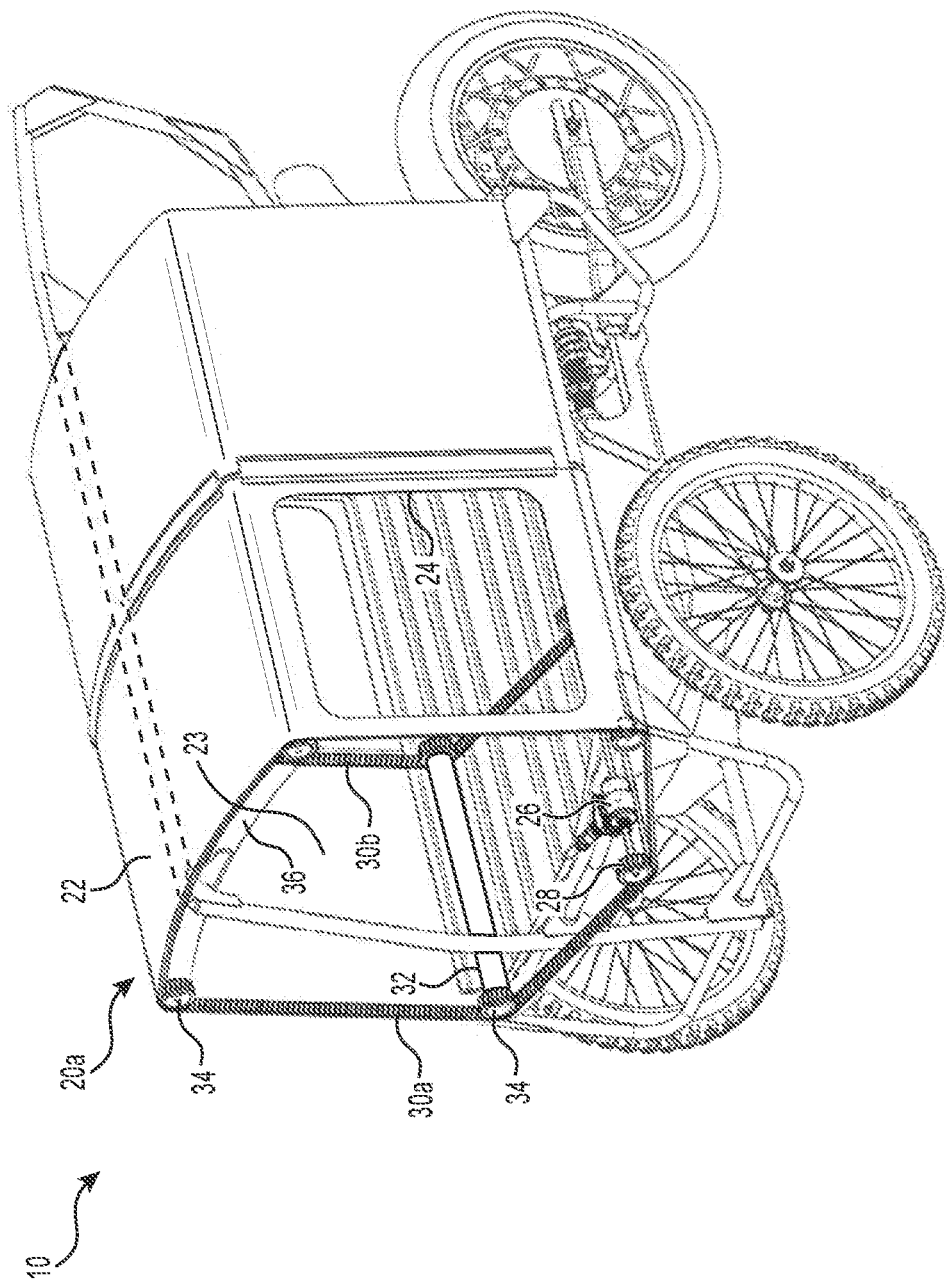
FIG. 1 shows a perspective view of a vehicle including a transportable enclosure in accordance with some embodiments of the present disclosure.

Referring to the drawings, the present invention will be described in detail in view of following embodiments. The present disclosure includes various embodiments of a transportable enclosure with a rotary door, and vehicles configured to carry one or more transportable enclosures.

The transportable enclosure present disclosure includes a door that can meet several different objectives. Those objectives may include: 1) the door should be to be activated fast and safely while being cost effective for vehicle type; 2) the door should be to provide opening on both sides of the vehicle, regardless of country/location but the opening must only be able to be accessed from one direction at a time; 3) the door should be able to be built out of a fabric (preferably slash/tear proof); and 4) the door and opening need to be fully scalable so vehicle/bot architecture can be scaled based on size of item(s) being delivered. The transportable enclosure and door assembly of the present disclosure may be used to keep cargo items, such as packages, secure in transit while also being able to quickly release one or more of the cargo items after the vehicle reaches its destination and after an authorized recipient has been verified.

The transportable enclosure of the present disclosure may provide several advantages over traditional enclosures with traditional doors. For example, the transportable enclosure may include a door assembly that is light-weight, low cost and require relatively few moving parts. The door of the transportable enclosure can rotate both clockwise and anti-clockwise directions, meaning a single door can provide access to each of two or more different areas, and which may be located on different sides of the enclosure, which may correspond to different sides of the vehicle. The transportable enclosure of the present disclosure can make it easy to reconfigure the side and/or location that is opened. No lock or latch mechanism may be required because a motor may hold the door in place. The door of the transportable enclosure may be easy to replace, thus reducing service costs. The transportable enclosure may be manufactured using relatively simple manufacturing process, thus enabling enclosures to be made at high volume with minimal investments. The transportable enclosure may be customable regarding the number and/or size of the opening(s).

Figure 2:
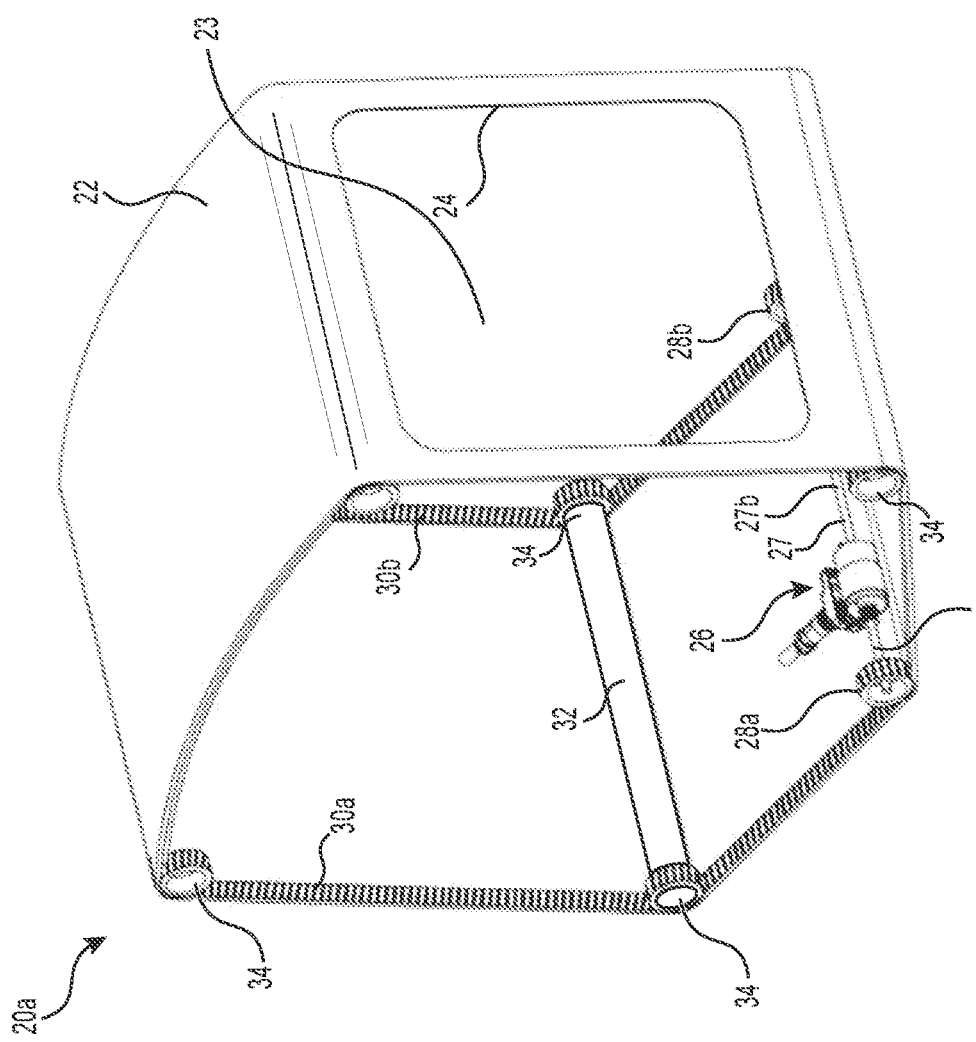
FIG. 2 shows a perspective view of the transportable enclosure of FIG. 1.

As shown in FIG. 1, a first vehicle 10 includes a first transportable enclosure 20a in accordance with some embodiments of the present disclosure. The first transportable enclosure 20a may be integrally constructed with the first vehicle 10. Alternatively, the first transportable enclosure 20a may be readily removable from the first vehicle 10, and the first vehicle 10 may be configured to hold one or more of the first transportable enclosures 20a. As shown in FIGS. 1-2, the first transportable enclosure 20a includes a door assembly comprising a first sheet 22 of flexible material defining a closed loop surrounding an interior space 23. The first sheet 22 defines a first opening 24 therethrough for providing access to load or unload cargo from the interior space 23. For example, the first sheet 22 may be rotated to a first position with the first opening 24 aligned to an access position, such as being aligned with the side of the first vehicle 10, as shown in FIG. 1, thus providing access to the interior space 23. The first sheet 22 may also be rotated to a second position (not shown in the Figures), with the first opening 24 misaligned from the access position, for preventing access to the interior space 23. For example, the first sheet 22 may be rotated such that the first opening 24 is aligned with a top or bottom surface or where the first opening 24 is otherwise obstructed, which may be used to block access to the interior space 23 during transportation or storage or other times when it is desirous to prevent access to the interior space 23.

The first sheet 22 may be made of fabric, such as a natural, synthetic or a hybrid of natural and synthetic materials. The first opening 24 may be generally rectangular, with rounded corners as shown in the Figures. However, the first opening 24 may have any shape and/or size. The shape and/or size of the first opening 24 may depend on the size and/or shape of the cargo items to be loaded and/or unloaded therethrough. The Figures show the first sheet 22 with a single first opening 24, although it could include any number of first openings 24, such as a single first opening 24 or two or more first openings 24.

The first transportable enclosure 20a also includes an actuator 26 configured to the closed loop of the first sheet 22 for selectively aligning the first opening 24 with the access position for loading or unloading cargo from the first vehicle 10 through the first opening 24. The actuator 26 may include one or more motors, which may be electrically driven. The actuator 26 may include other devices, such as one or more gearboxes, linkages, etc. In some embodiments, and as shown in FIG. 2, a pair of drive pulleys 28a, 28b are coupled to the actuator 26 via an axle 27 for rotating the first sheet 22. Specifically, the axle 27 includes two half-shafts 27a, 27b, with each of the drive pulleys 28a, 28b coupled to the actuator 26 via a corresponding one of the half-shafts 27a, 27b. In some embodiments, the actuator 26 is configured to rotate the closed loop of the first sheet 22 in either of two opposite directions. For example, the actuator 26 may rotate the first sheet 22 in either a clockwise or an anti-clockwise direction. The actuator 26 may be configured to hold or to lock a position of the first sheet 22. In some embodiments the actuator 26 may be configured to prevent the first sheet 22 from being rotated in the absence of power to the actuator 26. For example, the first transportable enclosure 20a may include a brake or a worm gear drive that provides a holding torque to prevent the first sheet 22 from being rotated until and unless a particular operation is performed (e.g. deactivating the brake and/or energizing the actuator 26).

A belt 30a, 30b extends along the closed loop and is configured to engage one of the drive pulleys 28a, 28b, thus mechanically linking the actuator 26 with the closed loop of the first sheet 22 and providing for the actuator 26 to drive rotation of the first sheet 22. The belt 30a, 30b may include gear teeth or other structures configured to engage corresponding structures on the drive pulleys 28a, 28b for preventing slippage therebetween. The belt 30a, 30b may be integrally formed with the first sheet 22. Alternatively or additionally, the belt 30 may be attached to the first sheet 22. For example, the belt 30a, 30b may be attached to the first sheet 22 by gluing, stitching, or other bonding. In some embodiments, the first sheet 22 includes two belts 30a, 30b extending parallel and spaced apart from one another. More specifically, and as shown in the Figures, the two belts 30a, 30b may each be disposed along opposite peripheral edges of the first sheet 22. However, the door assembly 20 may include any number of belts 30a, 30b disposed in any location along the closed loop of the first sheet 22. In some embodiments, and as shown in the Figures, the belts 30a, 30b extend along an interior face of the first sheet 22 facing toward the enclosed space 23. However, in some other embodiments, one or more belts 30a, 30b may extend along an exterior face of the first sheet 22, facing away from the enclosed space 23.

In some embodiments, and as shown in the Figures, one or more guides 32, 34, 36 are configured to hold the closed loop of the first sheet 22 outwardly while allowing the closed loop of the first sheet 22 to rotate. In some embodiments, the guides 32, 34, 36 may include one or more guide pulleys 32 configured to roll as the closed loop of the first sheet 22 is rotated. Each of the guide pulleys 32 may be configured as a wheel and/or as an elongate roller. One or more of the guides 32, 34, 36 may be configured as an idler pulley 34 configured to engage the belt 30. In some embodiments, one or more of the guides 32, 34, 36 may be biased outwardly to tension the first sheet 22. For example, one or more of the guides 32, 34, 36 may be biased outwardly by a tension spring.

In some embodiments, and as shown in FIG. 1, one or more of the guides 32, 34, 36 may include an extended portion 36 configured to hold the closed loop of the first sheet 22 outwardly while allowing the closed loop of the first sheet 22 to slide therealong. For example, the extended portion may be formed as a flat or a curved extended portion 36, which may be called a "ski" guide, holding a straight or an arc-shaped portion of the closed loop of the first sheet 22.

Figure 3:
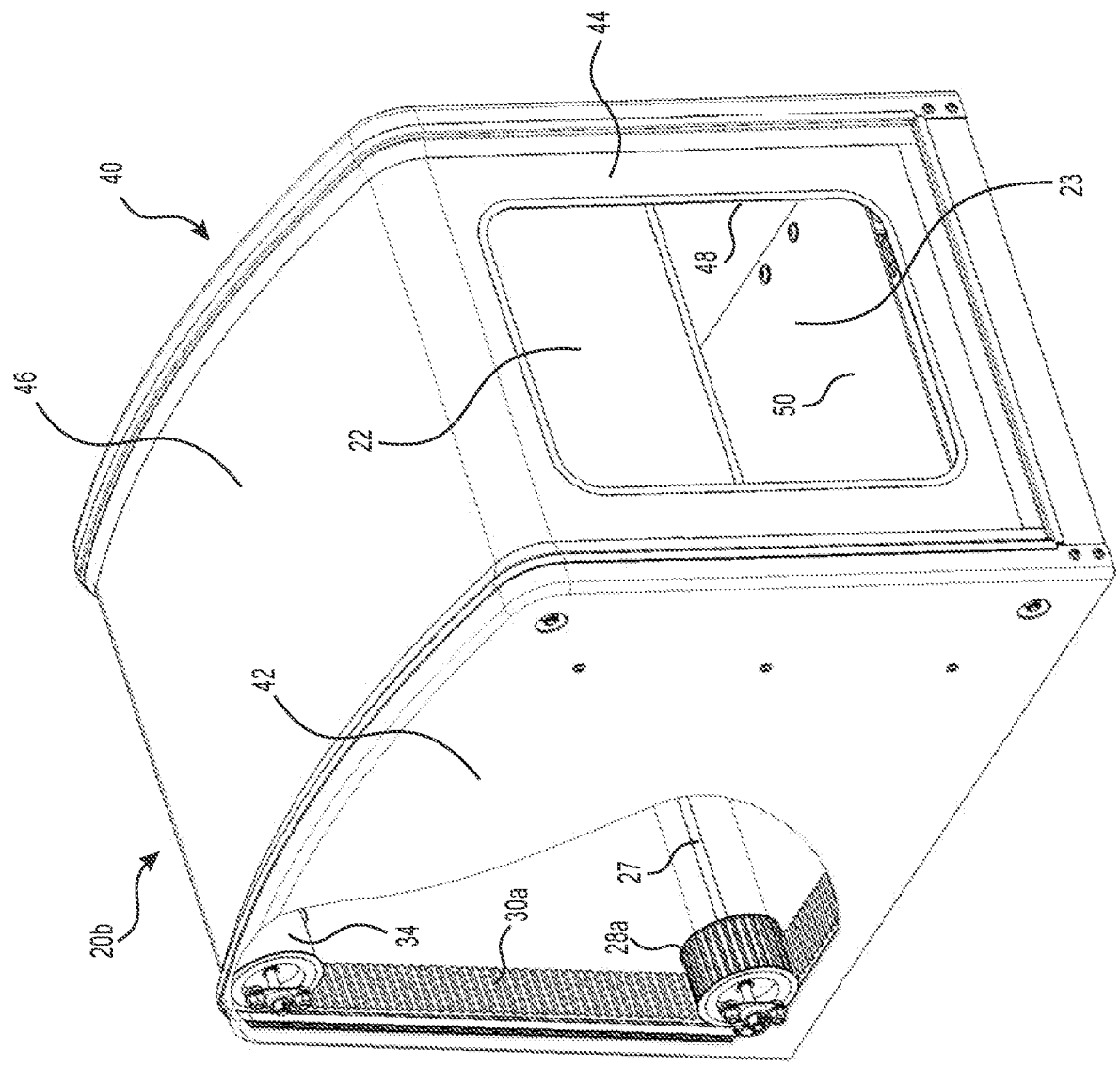
FIG. 3 shows a perspective view of a transportable enclosure with a partially cut-away side panel in accordance with some embodiments of the present disclosure.
Figure 4:
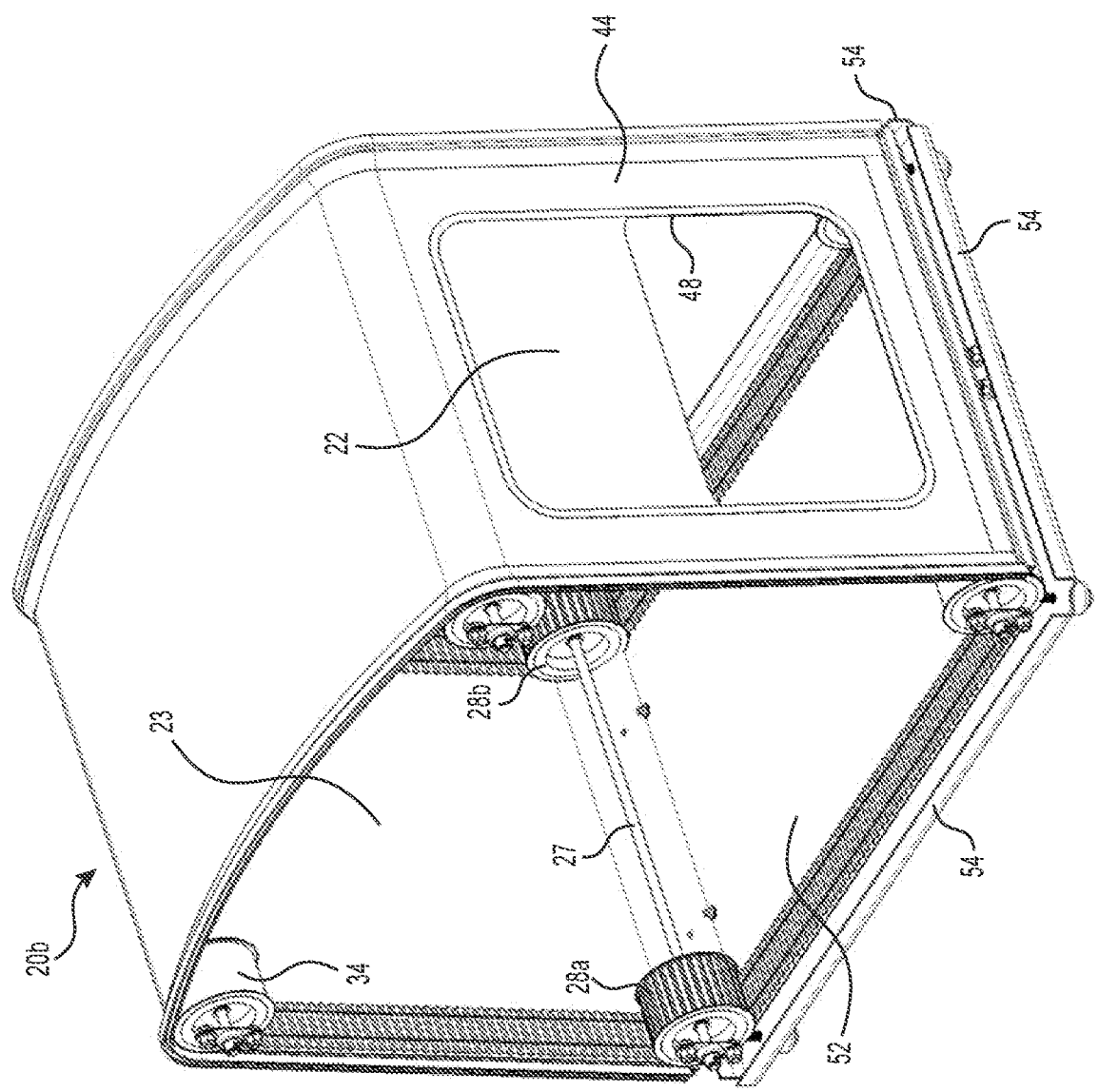
FIG. 4 shows a perspective view of a transportable enclosure in accordance with some embodiments of the present disclosure.

FIGS. 3-4 show a second transportable enclosure 20b in accordance with some embodiments of the present disclosure. The second transportable enclosure 20b may be similar to the first transportable enclosure 20a, with the addition of a housing 40 surrounding the closed loop of the first sheet 22. In some embodiments, some or all of the housing 40 may be disposed within the closed loop of the first sheet 22.

The housing 40 includes a pair of end panels 42 each covering a corresponding open side of the closed loop of the first sheet 22. The housing 40 also includes a pair of side panels 44 and a top panel 46. The side panels 44 and the top panel 46 may be integrally formed with a U-shaped construction, as shown. The side panels 44 and the top panel 46 may have other configurations, such as separate pieces of material joined along one or more edges. The housing 40 of FIG. 3 is partially cut-away to show the mechanism of the door assembly that would otherwise not be visible.

As shown in FIG. 3, the second transportable enclosure 20b includes a floor 50 within the interior space 23 for holding cargo and for preventing the cargo from interfering with operation of the door. Other panels and/or shields (not shown) may be used to block cargo items from contacting the first sheet 22 at the sides and/or the top of the second transportable enclosure 20b. As shown in FIG. 4, a baseplate 52 is disposed below a bottom of the first sheet 22 to define a lowermost part of the second transportable enclosure 20b. The baseplate 52 includes a rim 54 around one or more peripheral edges thereof for holding other parts of the housing 40, such as the end panels 42 and/or the side panels 44.

As shown in FIGS. 3-4, one of the side panels 44 of the housing 40 defines a port 48. The location of the port 48 may define the access position, such that access to the enclosed space 23 is available through the port 48 only when the first opening 24 of the first sheet 22 is aligned therewith. In some embodiments, each of the side panels 44 of the housing 40 may define respective ports 48. Other parts of the housing 40, such as the top panel 48 and/or the baseplate 52 may define a port 48 for providing access to the interior space 23 when aligned with the first opening 24 of the first sheet 22. The housing 40 may be configured to prevent moisture, such as precipitation, from entering the interior space 23 until and unless the first opening 24 of the first sheet 22 is aligned with the port 48 in the housing 40.

Figure 5:
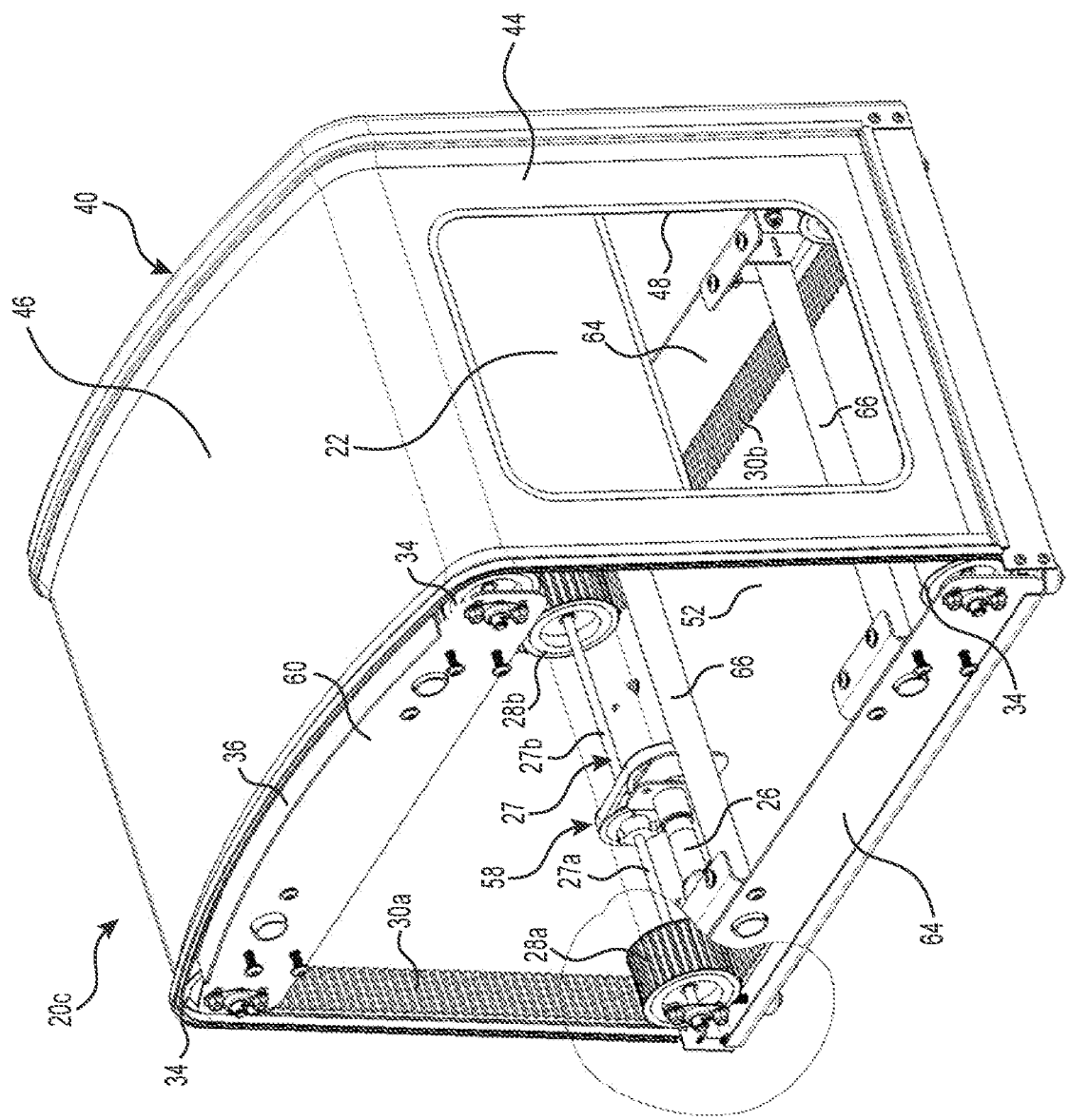
FIG. 5 shows a perspective view of a transportable enclosure with a partially cut-away support brace in accordance with some embodiments of the present disclosure.

FIG. 5 shows a third transportable enclosure 20c in accordance with some embodiments of the present disclosure. The third transportable enclosure 20c may be similar to the second transportable enclosure 20b with some variations, as shown in the Figures and described herein. The third transportable enclosure 20c includes the actuator 26 configured to rotate the first sheet 22 by turning the drive pulleys 28a, 28b via a pulley drive 58 connected to the half shafts 27a, 27b of the axle 27. An upper bracket 60 extends along the top panel 46 adjacent to each of the end panels 46 (not shown on FIG. 5) and holds an idler pulley 34 at each end thereof. A lower bracket 64 extends along the baseplate 52 adjacent to each of the end panels 46 (not shown on FIG. 5) and holds an idler pulley 34 at one end, and one of the drive pulleys 28a, 28b at an opposite end thereof. A pair of cross-braces 66 extend between the lower brackets 64. Similar cross-braces (not shown) may extend between the upper brackets 60 to provide structural support therebetween.

Figure 6:
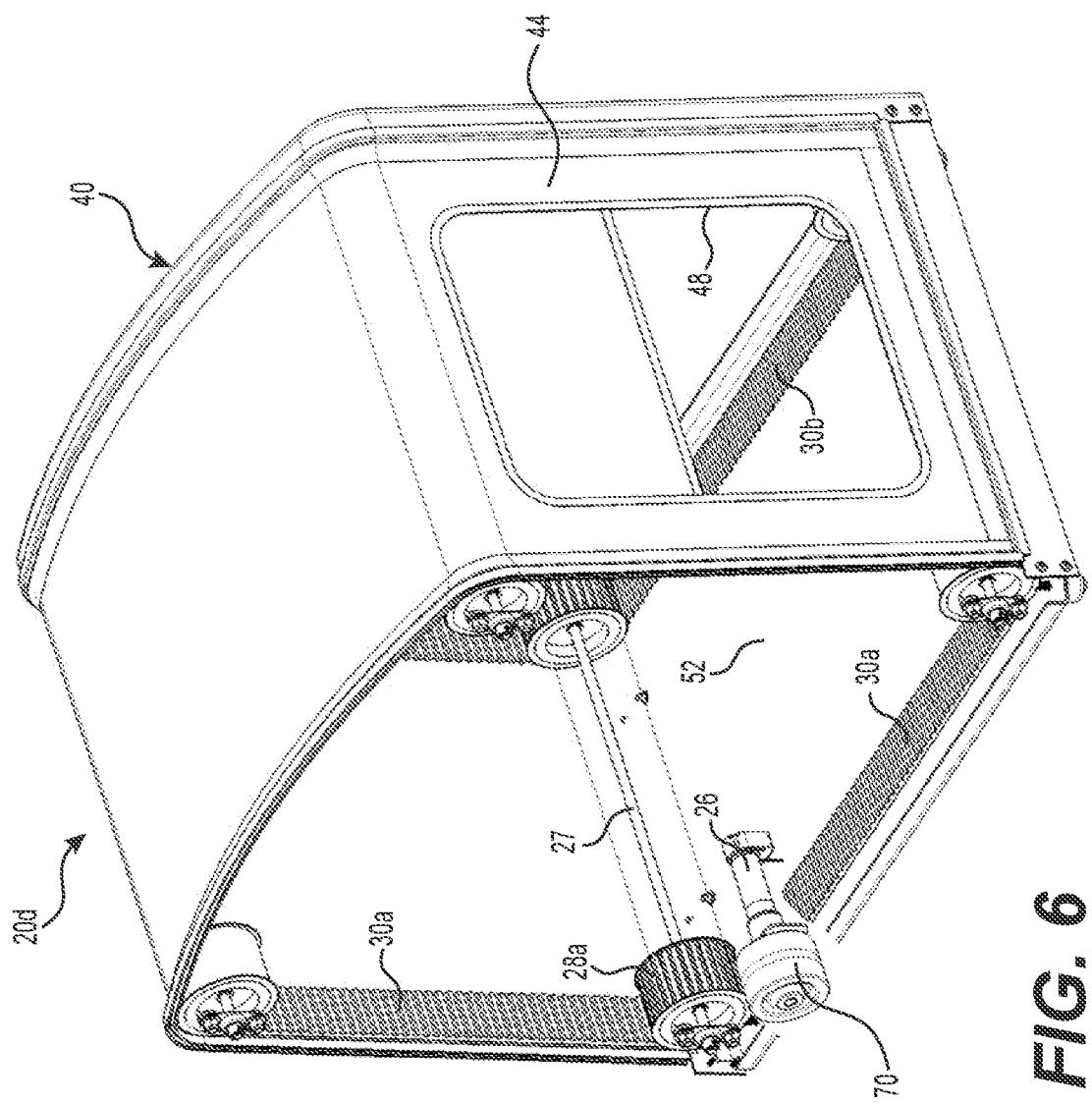
FIG. 6 shows a perspective view of a transportable enclosure with a partial cut-away in accordance with some embodiments of the present disclosure.

FIG. 6 shows a fourth transportable enclosure 20d in accordance with some embodiments of the present disclosure. The fourth transportable enclosure 20d may be similar to the second transportable enclosure 20b with some variations, as shown in the Figures and described herein. The third transportable enclosure 20d includes the actuator 26 configured to rotate the first sheet 22 by via an external drive wheel 70. The external drive wheel 70 may directly contact the first sheet 22, with the first sheet 22 sandwiched between the external drive wheel 70 and one of the drive pulleys 28a, 28b. Although only one external drive wheel 70 is shown, the fourth transportable enclosure may include any number of external drive wheels 70. The external drive wheel 70 may be directly coupled to the actuator 26, and/or it may be indirectly coupled via a drive mechanism, such as a gearbox and/or one or more linkages. The drive pulleys 28a, 28b may be connected together via the axle 27 to evenly distribute the force from the external drive wheel 70 and to keep the first sheet 22 aligned within the housing 40. One or more of the drive pulleys 28a, 28b may provide a biasing force against the external drive wheel 70 to cause the first sheet 22 to rotate with the external drive wheel 70. Either or both of the external drive wheel 70 and/or a corresponding one of the drive pulleys 28a, 28b may be biased into contact with the first sheet 22, for example by a spring, to maintain contact between the external drive wheel 70 and the first sheet 22 and to prevent slippage therebetween.

Figure 7:
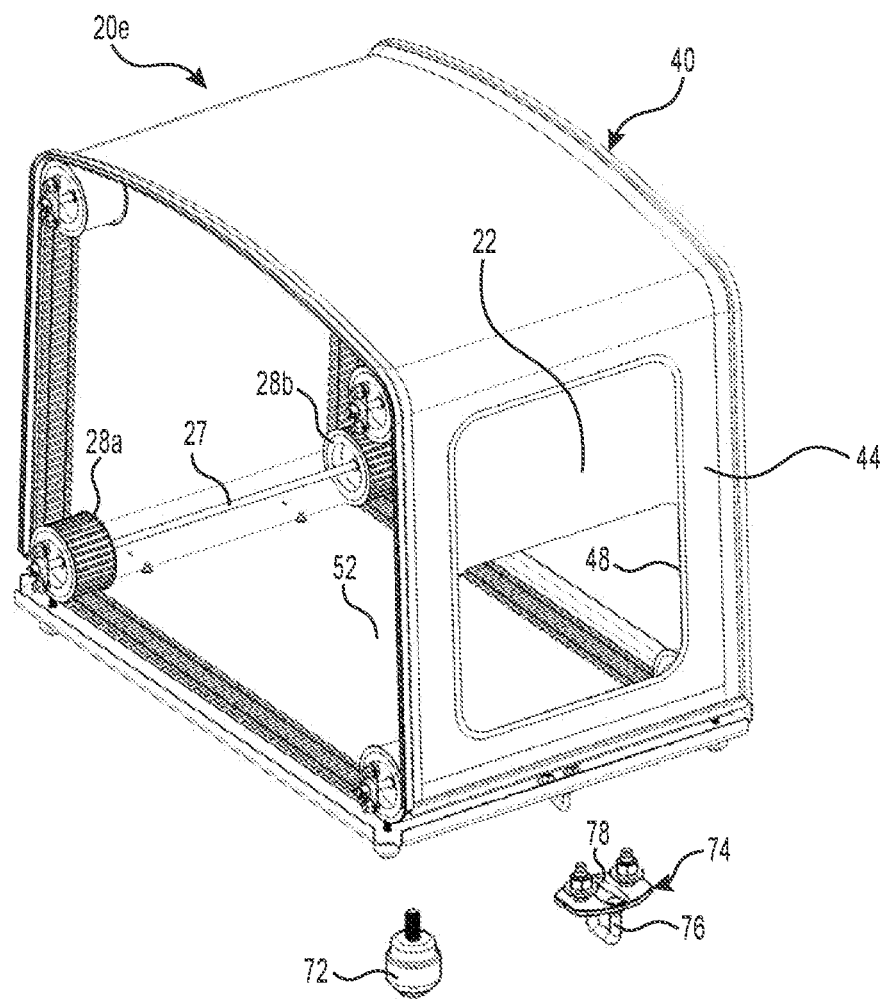
FIG. 7 shows a perspective exploded view of a transportable enclosure in accordance with some embodiments of the present disclosure.

FIG. 7 shows a fifth transportable enclosure 20e in accordance with some embodiments of the present disclosure. The fifth transportable enclosure 20e may be similar or identical to one or more of the other transportable enclosures 20a, 20b, 20c, 20d of the present disclosure, with the addition of mounting hardware 72, 74. The mounting hardware 72, 74 includes one or more bumpers 72, which may include rubber or other resilient material for damping vibration between the fifth transportable enclosure 20e and external structures, such as a mounting structure on a vehicle. The bumpers 72 may include a mounting fastener, such as a threaded rod for securement to the baseplate 52. The mounting hardware 72, 74 also includes one or more lugs 74 configured to secure the fifth transportable enclosure 20e to an external structure, such as a mounting structure on a vehicle. The lugs 74 may be configured as shown in FIG. 7, with a hoop 76 of metal or other rigid material secured to a mounting plate 78 which is configured to be fastened to the baseplate 52. The mounting plate 78 may be secured to the baseplate 52 with nuts threaded on one or more threaded studs, as shown. However, the mounting plate 78 may be secured to the baseplate 52 in other ways, such as by welding, adhesive, riveting and/or using other types of fasters. Alternatively, the mounting plate 78 may be integrally formed with the baseplate 52.

Figure 8C:
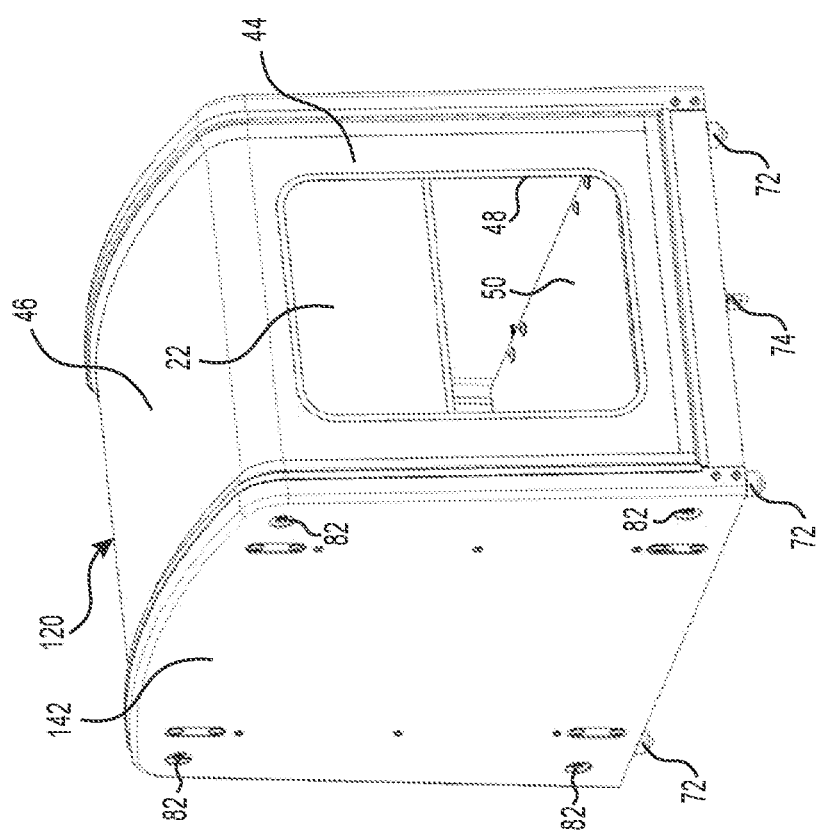
FIG. 8C shows a perspective side view of the transportable enclosure of FIG. 8A.

FIGS. 8A-8C show a sixth transportable enclosure 120 in accordance with some embodiments of the present disclosure. The sixth transportable enclosure 120 may be similar or identical to the fifth transportable enclosure 20e and/or one or more of the other transportable enclosures 20a, 20b, 20c, 20d of the present disclosure. The sixth transportable enclosure 120 includes a pair of end covers 142 which may be similar or identical to the end panels 42 described.

As shown in FIGS. 8A-8B, the baseplate 52 defines two drive apertures 80, with each of the drive apertures 80 having a square shape that is aligned with a corresponding one of the drive pulleys 28a, 28b. The drive apertures 80 are configured to receive an external drive wheel 70 (not shown in FIGS. 8A-8C) from outside of the sixth transportable enclosure 120 for rotating the closed loop of the first sheet 22. It should be appreciated that this is merely one example, and the drive aperture 80 could extend through another part of the housing 40, such as one or more of the side panels 44 and/or one or more of the end covers 142.

As shown in FIGS. 8A-8C, the end covers 42 include a plurality of driver openings 82, with each of the driver openings 82 overlying a center of a corresponding one of the idler pulleys 34 or the drive pulleys 28a, 28b for providing access to a tool feature 84, such as a bolt head or a screw slot on or attached to an axle of a corresponding one of the idler pulleys 34 or the drive pulleys 28a, 28b. The tool feature 84 is configured to receive an external tool (not shown in FIGS. 8A-8C) for turning the corresponding one of the idler pulleys 34 or the drive pulleys 28a, 28b in order to rotate the closed loop of the first sheet 22. In other words, the tool feature 84 is configured to be driven to rotate by the external tool, when the external tool is inserted through the driver opening 82. Such external operation, using a driver opening 82 to access a tool feature 84, may allow for access to the interior space 23 when the actuator 26 is not functional or when the actuator 26 is detached from the sixth transportable enclosure 120, such as when the sixth transportable enclosure 120 is removed from the vehicle 10, 110. FIGS. 8A-8C show four driver openings 82, with each of the driver openings 82 located adjacent to a corner of the end cover 142. However, the sixth transportable enclosure 120 may include any number of driver openings 82, such as a single driver opening 82 aligned with a corresponding one of the drive pulleys 28a, 28b.

In some embodiments, such as in the first and third transportable enclosures 20a, 20c, the actuator 26 is disposed inside of the transportable enclosure 20a, 20c. In some other embodiments, such as in the second, fourth, fifth, and sixth transportable enclosures 20b, 20d, 20e, 120, the actuator 26 is disposed outside of the transportable enclosure 20b, 20d, 20e, 120. The actuator 26 may be coupled to cause the first sheet 22 to rotate via an external drive wheel 70, as shown in the second, fourth, fifth, and sixth transportable enclosures 20b, 20d, 20e, 120. However, the actuator 26 may be coupled to cause the first sheet 22 to rotate in other ways not shown in the Figures, such as by engaging and turning a gear that drives the axle 27 and/or one or both of the drive pulleys 28a, 28b. In some embodiments, the transportable enclosure 20a, 20b, 20c, 20d, 20e, 120 may include two or more actuators 26, which may be disposed inside, outside, and/or a combination of inside and outside of the transportable enclosure 20a, 20b, 20c, 20d, 20e, 120.

Figure 9:
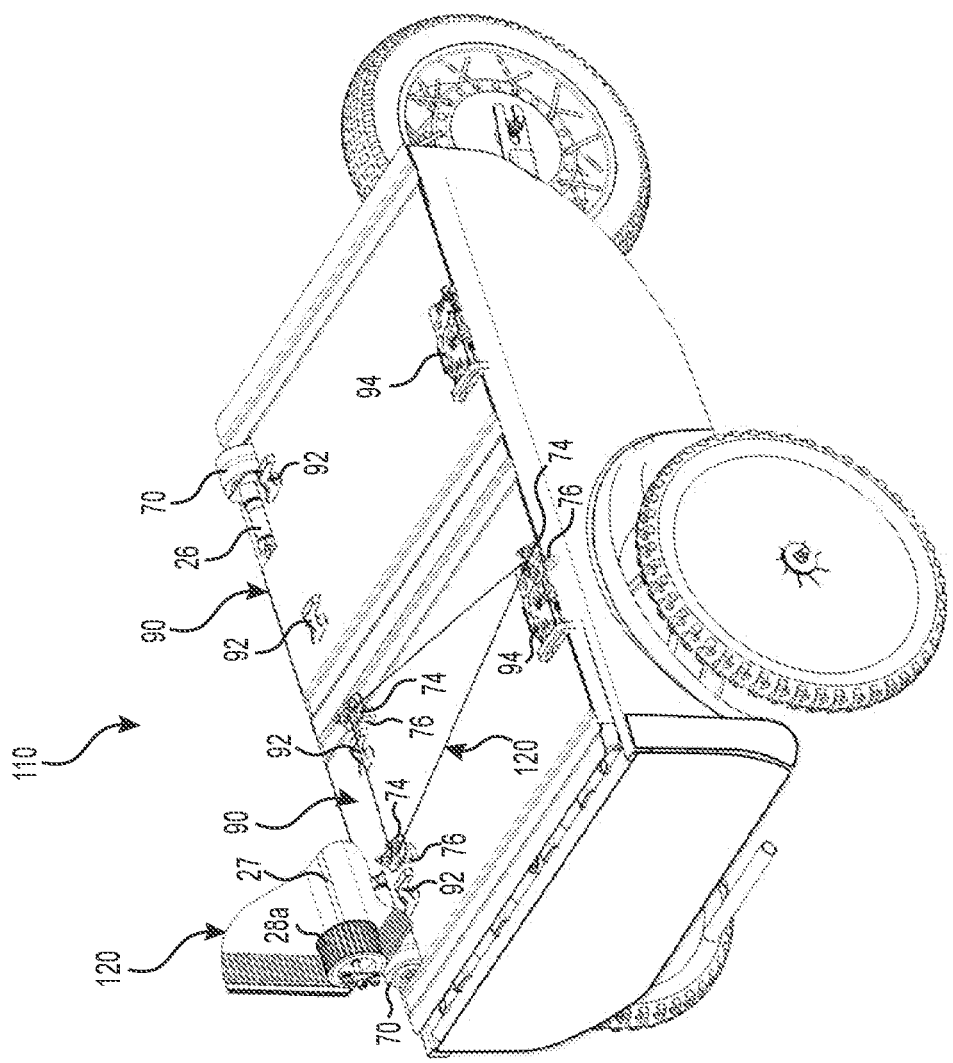
FIG. 9 shows a perspective view of a vehicle with partial sections of a transportable enclosure, showing interfaces between the transportable enclosure and the vehicle, in accordance with an aspect of the present disclosure.

FIG. 9 shows a second vehicle 110 with partial sections of the sixth transportable enclosure 120, showing interfaces between the sixth transportable enclosure 120 and the second vehicle 110. The second vehicle 110 shown on FIG. 9 includes two enclosure docks 90, which are areas of the second vehicle 110 that are configured to receive and/or to hold one or more of the transportable enclosures 20a, 20b, 20c, 20d, 20e, 120. Each of the enclosure docks 90 shown on FIG. 9 is configured to receive and to hold a corresponding one of the sixth transportable enclosures 120. This is merely an example, and the second vehicle 110 may have any number of enclosure docks 90 for holding any number of the transportable enclosures 20a, 20b, 20c, 20d, 20e, 120.

As shown in FIG. 9, each of the enclosure docks 90 includes an actuator 26 and an external drive wheel 70, with the actuator 26 configured to rotate the external drive wheel. With a sixth transportable enclosure 120 located on one of the enclosure docks 90, the external drive wheel 70 protrudes through a corresponding one of the drive apertures 80, with the closed loop of the first sheet 22 sandwiched between the external drive wheel 70 and a corresponding one of the drive pulleys 28a, 28b. In this way, the actuator 26 may apply a force to rotate the closed loop of the first sheet 22 into or out of a position providing access to the interior space 23. Alternatively or additionally, the actuator 26 or another device, such as a supplemental brake, may apply a braking force to prevent the external drive wheel 70 from turning, thus preventing the closed loop of the first sheet 22 from being rotated into or out of a position providing access to the interior space 23.

FIG. 9 includes a section of the sixth transportable enclosure 120 showing the relative locations of three hoops 76 and corresponding structures on the enclosure docks 90. Specifically, the enclosure docks 90 shown in FIG. 9 each include two static catches 92 and a latch 94 for holding the sixth transportable enclosure 120 on the second vehicle 110. The two static catches 92 each have a hook shape configured to receive a hoop 76 of a corresponding one of the lugs 74 on the bottom of the sixth transportable enclosure 120. The latch 94 is configured to selectively engage and hold a hoop 76 of a corresponding one of the lugs 74 on the bottom of the sixth transportable enclosure 120. Together, the two static catches 92 and a latch 94 function to locate and align the sixth transportable enclosure 120 in a precise location on the enclosure dock 90, for example, with the external drive wheel 70 aligned to apply the rotating force to the closed loop of the first sheet 22. It should be appreciated that the arrangement shown in FIG. 9 is merely an example, and enclosure docks 90 may include any number of static catches 92 and/or latch 94, and either or both of the static catches 92 and/or the latch 94 may have a different physical configuration than what is shown in the Figures. For example, one or more of the lugs 74 may include a mushroom-shaped pin that engages a corresponding receiving structure in one of the static catches 92 and/or the latch 94.

Figure 10:
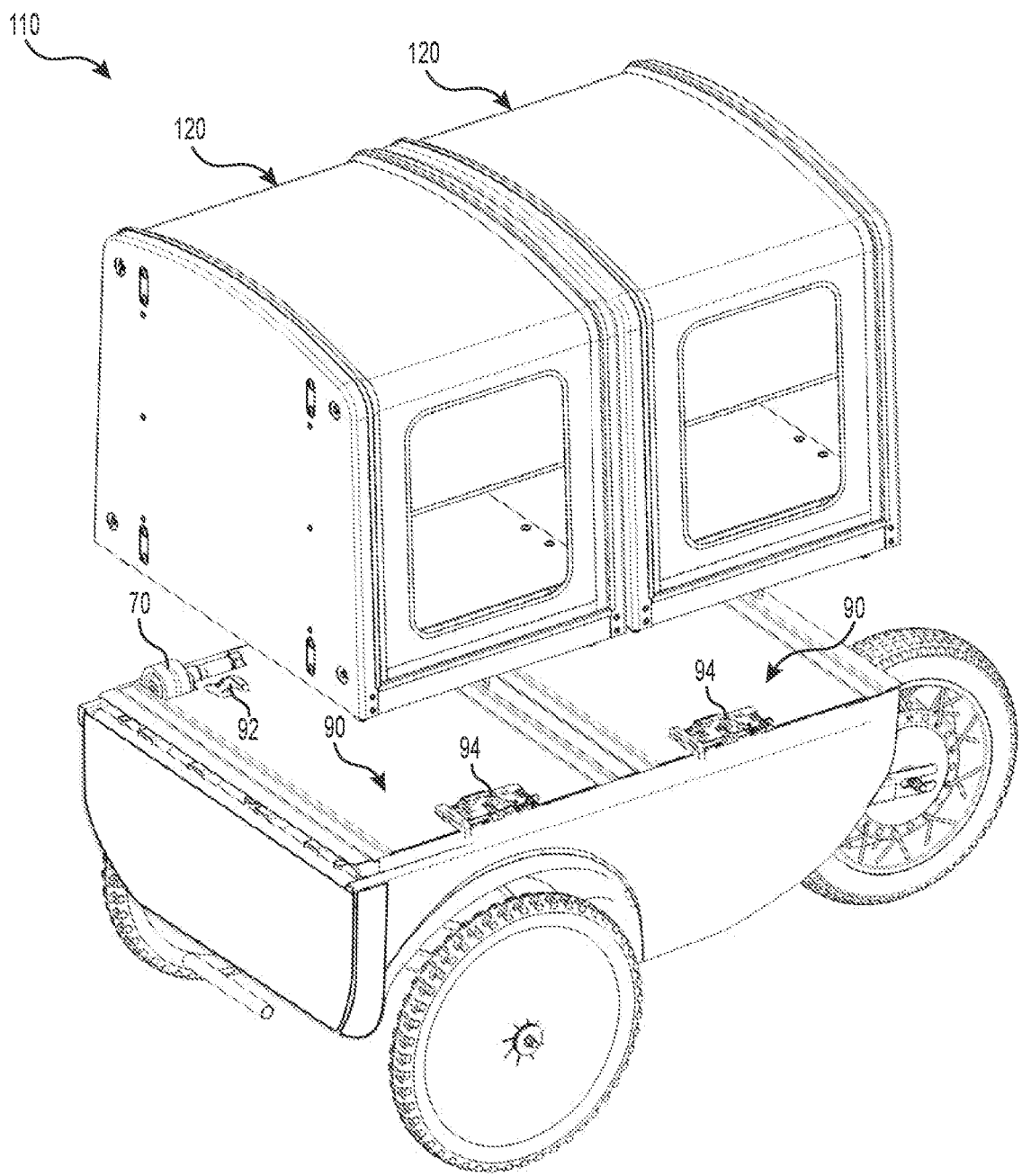
FIG. 10 shows a perspective view of a vehicle and two transportable enclosures detached therefrom.
Figure 11:
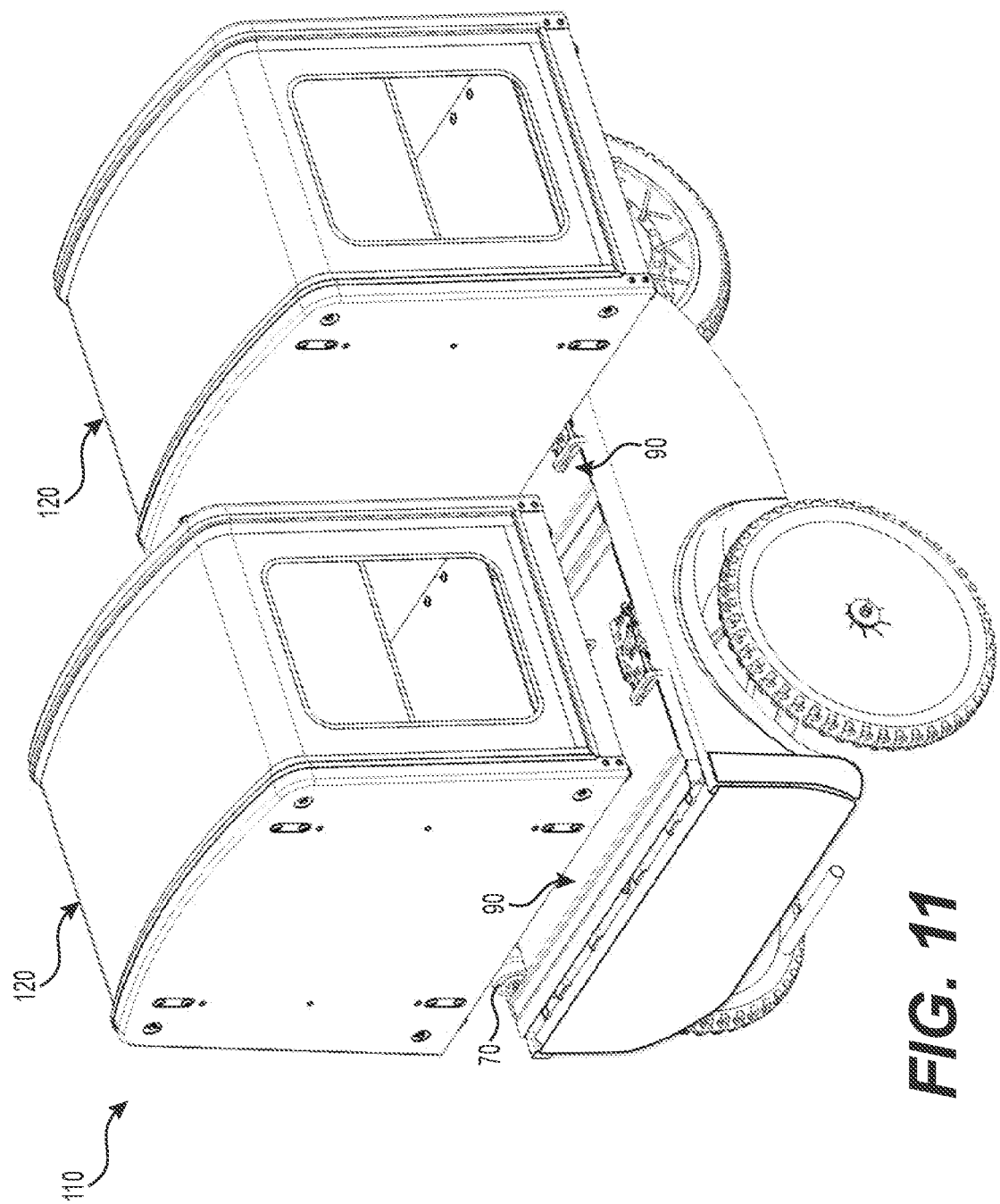
FIG. 11 shows a shows a perspective view of the vehicle and the two transportable enclosures of FIG. 10, with one of the transportable enclosures in a laterally translated position.
Figure 12:
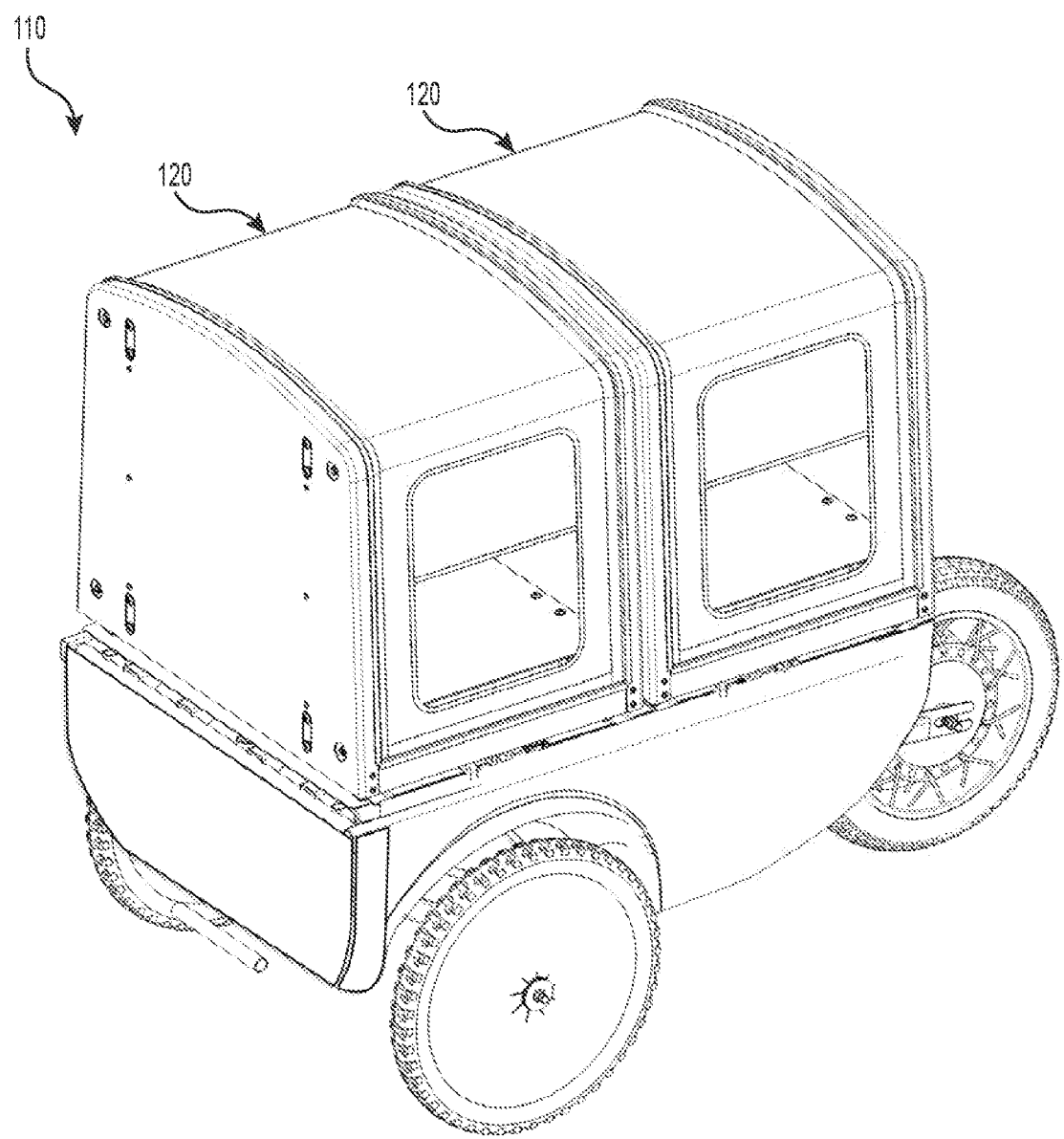
FIG. 12 shows a shows a perspective view of the vehicle and the two transportable enclosures of FIG. 10, with the two transportable enclosures attached to the vehicle.
Figure 13:
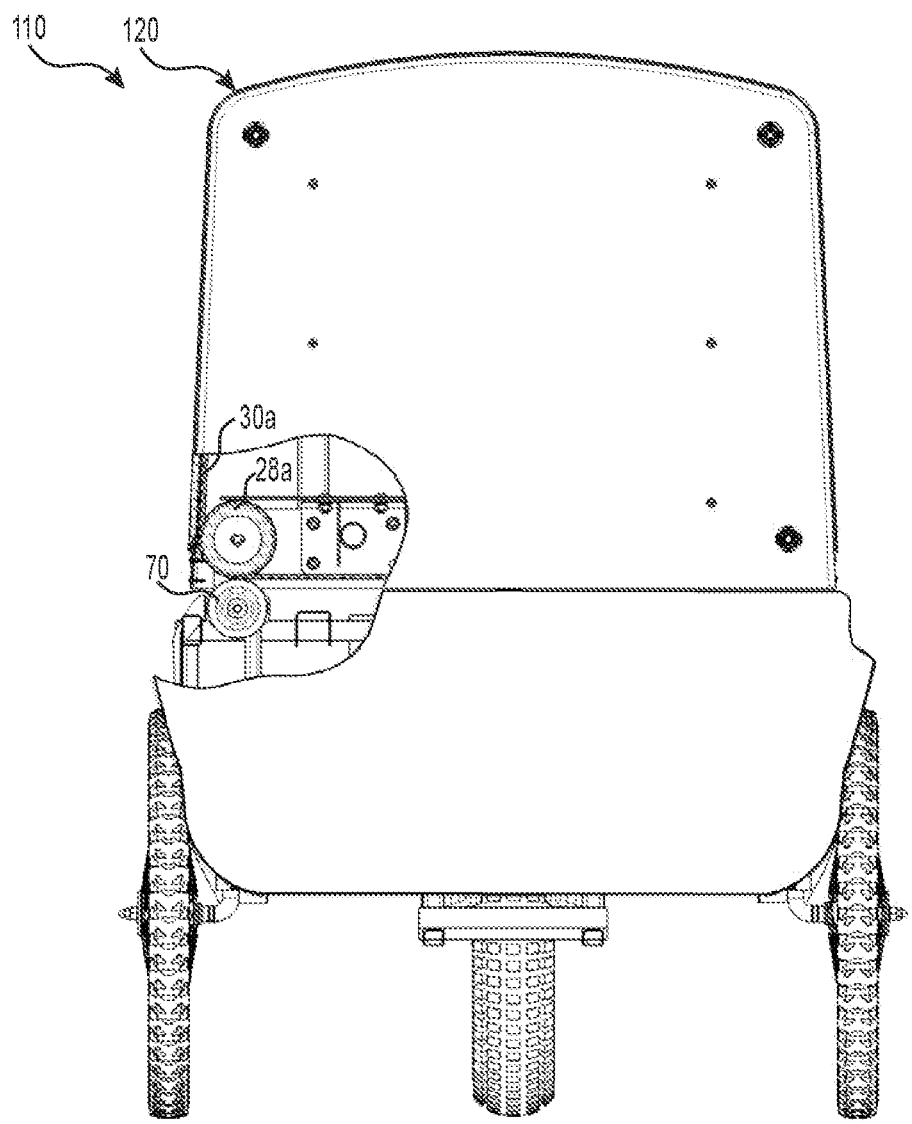
FIG. 13 shows a shows a rear view of the vehicle of FIG. 10, with a cut-away showing an interface between the vehicle and a transportable enclosure.
Figures 14, 15:
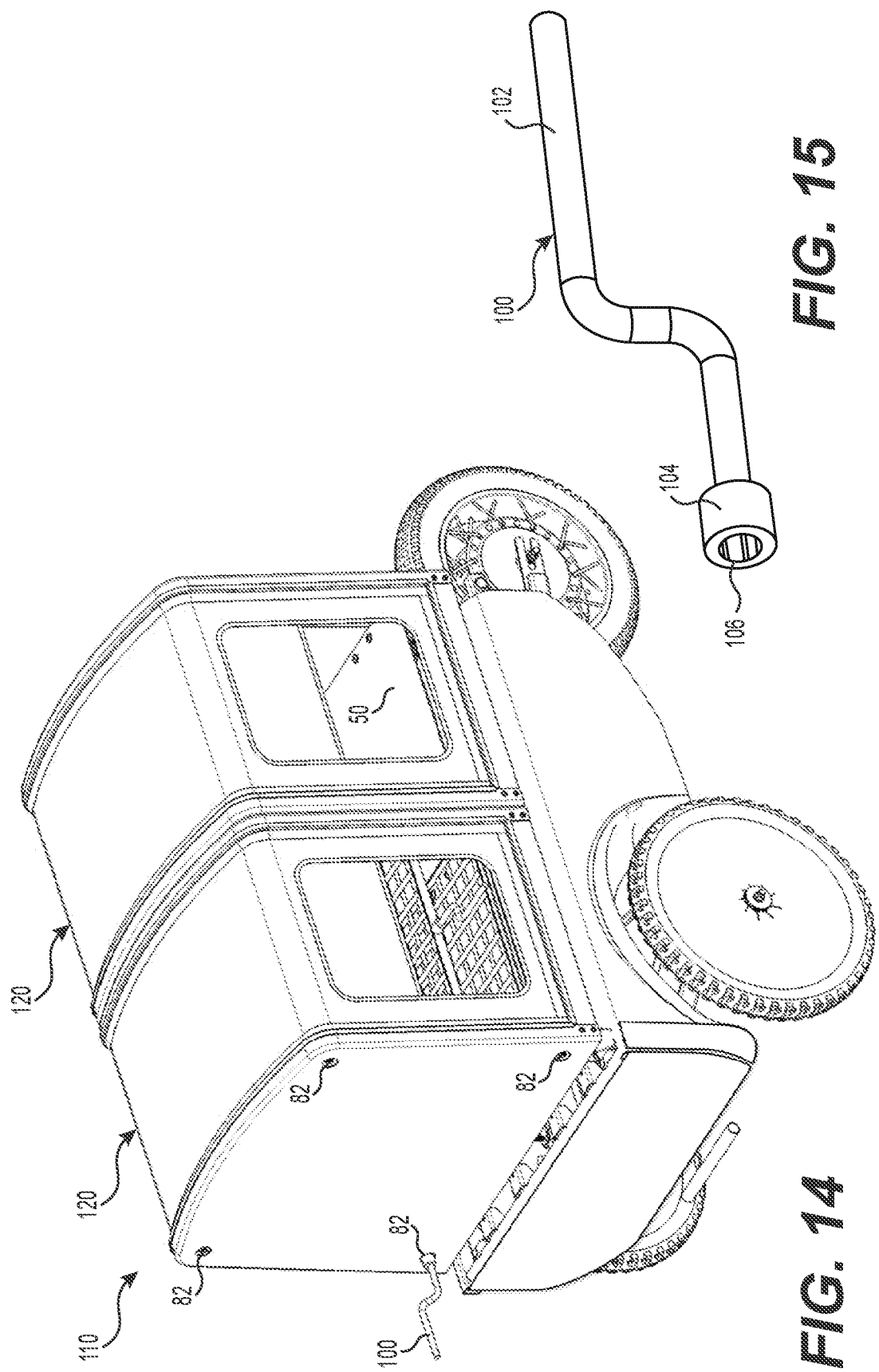
FIG. 14 shows a perspective view of a transportable enclosure in accordance with some embodiments of the present disclosure.
FIG. 15 shows a perspective view of an external tool for manually operating the transportable enclosure in accordance with some embodiments of the present disclosure.

FIGS. 10-12 show additional views of the second vehicle 110 with two of the sixth transportable enclosures 120. FIG. 13 shows a rear view of the second vehicle 110 with a sixth transportable enclosure 120 disposed thereupon, with a cut-away showing an interface between the second vehicle 110 and the sixth transportable enclosure 120. Specifically, FIG. 13 shows the belt 30a of the first sheet 22 sandwiched between the external drive wheel 70 and the drive pulley 28a. FIG. 14 shows another view of the second vehicle 110 with two of the sixth transportable enclosures 120, including an external tool 100 extending through one of the driver openings 82.

FIG. 15 shows the external tool 100 for manually operating the transportable enclosure in accordance with some embodiments of the present disclosure. The external tool 100 includes an S-shaped handle 102 with a head 104 on one end thereof. The head 104 defines a bore 106 with a specific shape for engaging the tool feature 84 for rotating the closed loop of the first sheet 22. For example, the bore 106 may have a hexagonal bore shape or another shape, such as a keyed shape. The head 104 may have a specific shape or keying to fit through the driver openings 82. The external tool 100 shown in FIG. 15 is merely an example, and the external tool 100 may have a different configuration or arrangement. For example, the external tool 100 may be a bit that is configured to be rotated by a power driver, such as a handheld drill motor. The head 104 may have a bore or "female" fitting, as shown on FIG. 15. Alternatively, the head 104 may have a protruding or "male" fitting, such as a Phillips-head or Torx bit for engaging a corresponding recess or "female" fitting on the tool feature 84.

In some embodiments, cargo items within the interior space 23 may be accessible only when the first opening 24 is aligned at a specific orientation that corresponds to the port 48 in the enclosure 40 and/or with an internal structure within the interior space 23, such as a dispensing rack or an internal door. This may provide an additional protection against unauthorized access to the cargo items within the interior space 23. The closed loop of the first sheet 22 may also protect the interior space 23 and cargo contained therein from exposure to moisture, dust or other contaminants, and/or sunlight that can some items to degrade.

The vehicles 10, 110 are each shown as a tricycle with three wheels. However, the transportable enclosures 20a, 20b, 20c, 20d, 20e, 120 of the present disclosure may be used with other types of wheeled vehicles and/or with other non-wheeled vehicles. For example, the transportable enclosures 20a, 20b, 20c, 20d, 20e, 120 of the present disclosure may be used on an aerial vehicle, such as an airplane, a helicopter, or a multi-rotor aerial vehicle such as a quadcopter or an octocopter. In some embodiments, the vehicle 10, 110 is an unmanned vehicle having no human pilot onboard. More specifically, in some embodiments, the vehicle 10, 110 may be an autonomous vehicle piloted primarily or exclusively by one or more computers.

In some embodiments, and as shown in the Figures, the first sheet 22 is rotated such that the first opening 24 moves vertically into or out of alignment with the access position, such as the port 48 in the enclosure 40. In other embodiments, the first sheet 22 may be rotated in another orientation or direction. For example, the first sheet 22 may be rotated such that the first opening 24 moves horizontally into or out of alignment with the access position.

In some embodiments, and as shown in the Figures, the transportable enclosure 20a, 20b, 20c, 20d, 20e, 120 includes only one first sheet 22. However, in some other embodiments, the transportable enclosure 20a, 20b, 20c, 20d, 20e, 120 may include two or more sheets 22. For example, the transportable enclosure 20a, 20b, 20c, 20d, 20e, 120 may include the first sheet 22 with a first opening 24 that is configured to move vertically into or out of alignment with the access position, and a second sheet disposed around or within the first sheet 22, with a corresponding opening that is configured to move horizontally into or out of alignment with the access position. Such a configuration with two or more sheets each moving in different directions, may provide enhanced security. Such a configuration with two or more sheets each moving in different directions, may provide enhanced weatherproofing as well. In some embodiments, the transportable enclosure 20a, 20b, 20c, 20d, 20e, 120 may include two or more sheets 22 each formed as a closed loop. Alternatively, one or more of the sheets may have another configuration, such as a non-closed configuration.

Figure 16:
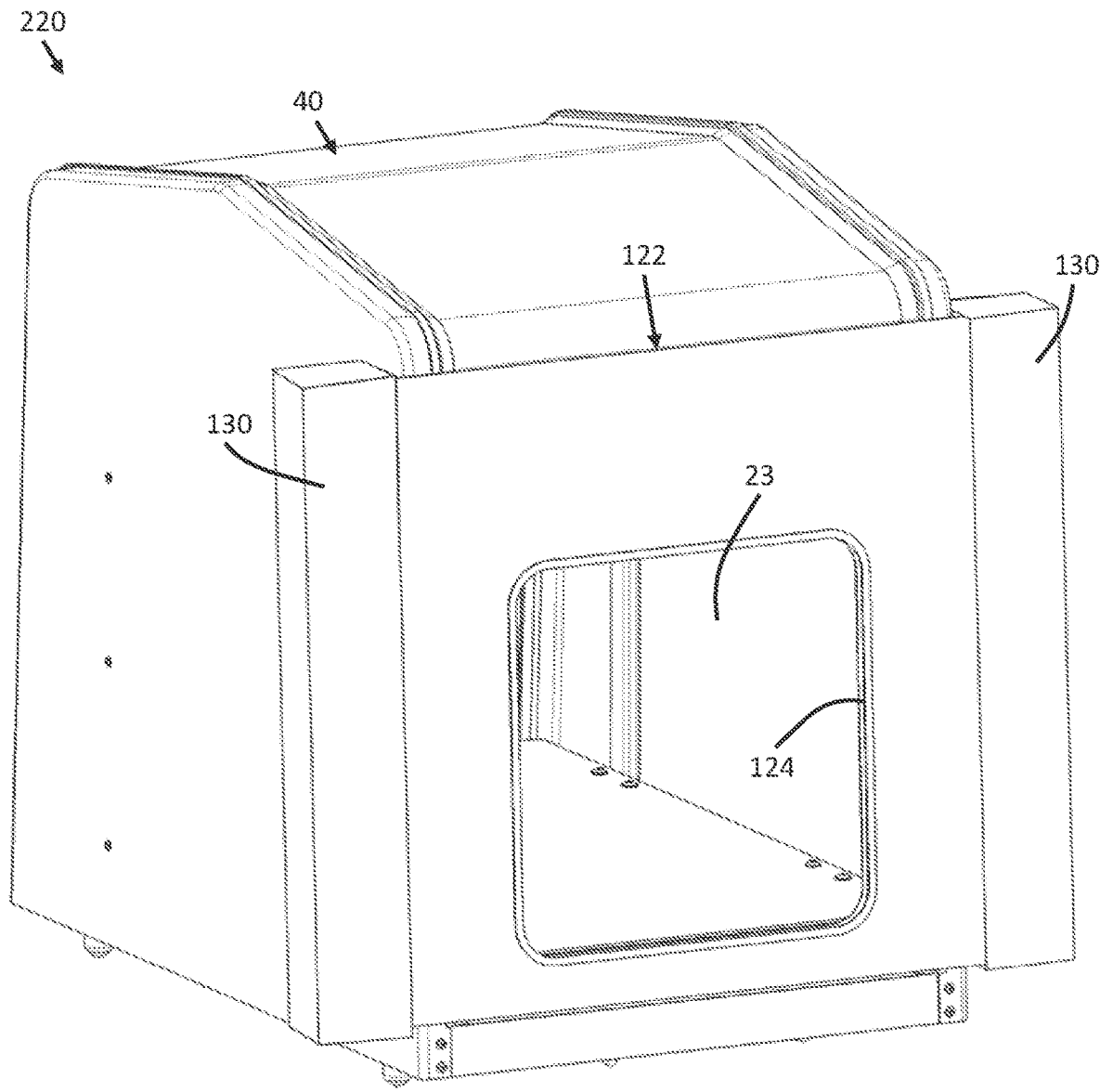
FIG. 16 shows a perspective view of a transportable enclosure with a second sheet in accordance with some embodiments of the present disclosure.
Figure 17:
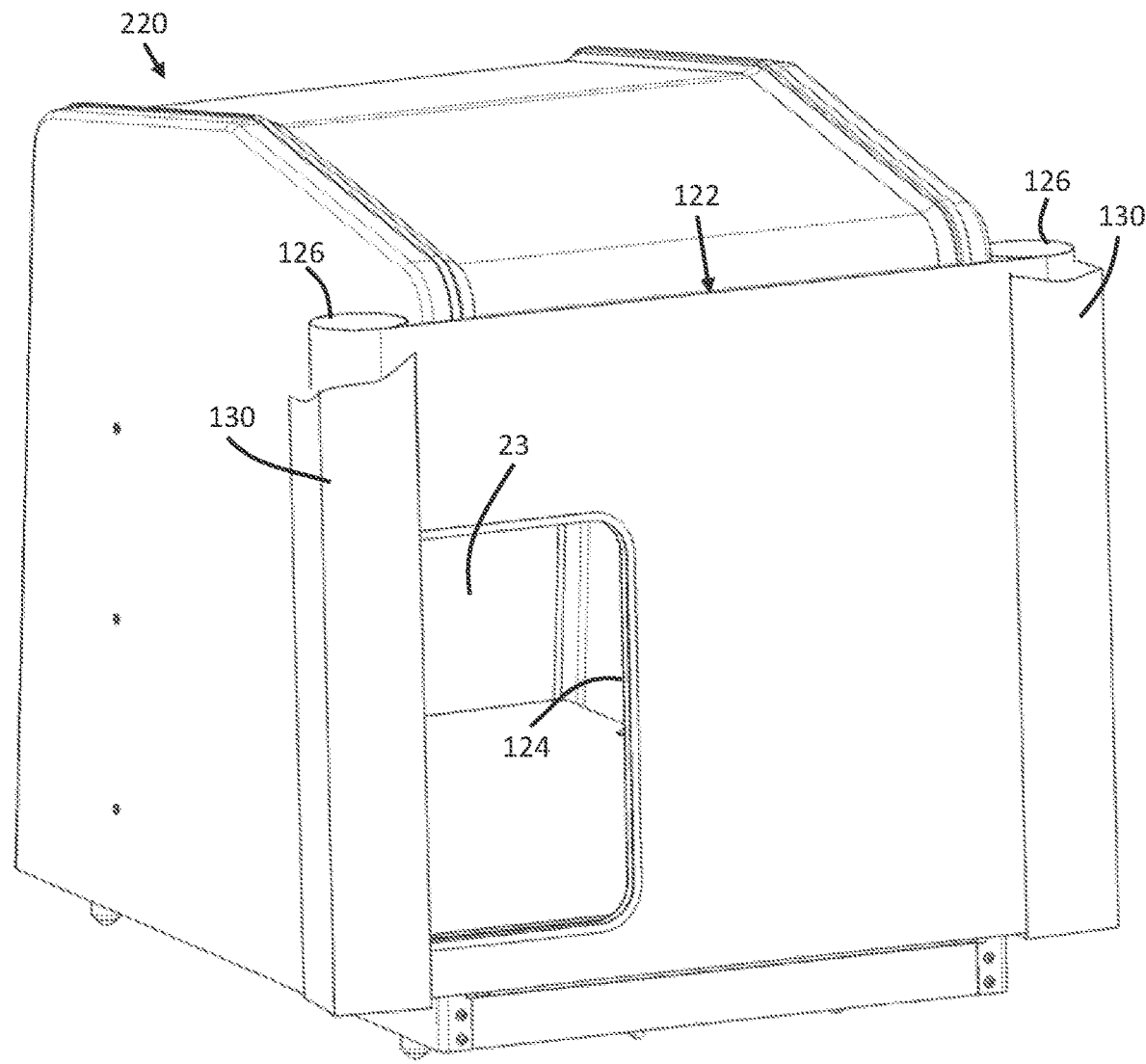
FIG. 17 shows a perspective view of the transportable enclosure of FIG. 16, with the second sheet in a partially closed position.
Figure 18:
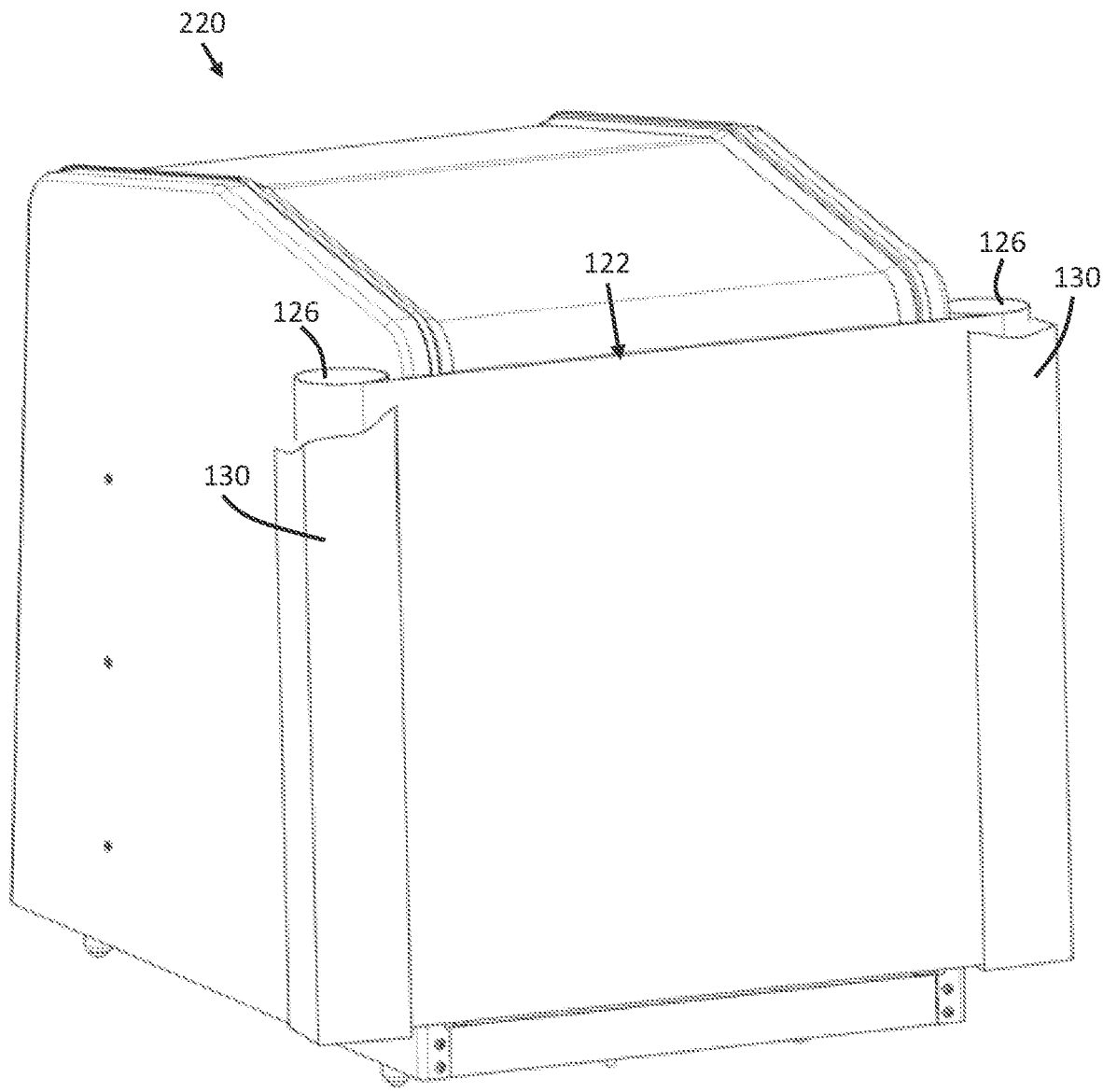
FIG. 18 shows a perspective view of the transportable enclosure of FIG. 16, with the second sheet in a fully closed position.
Figure 19:
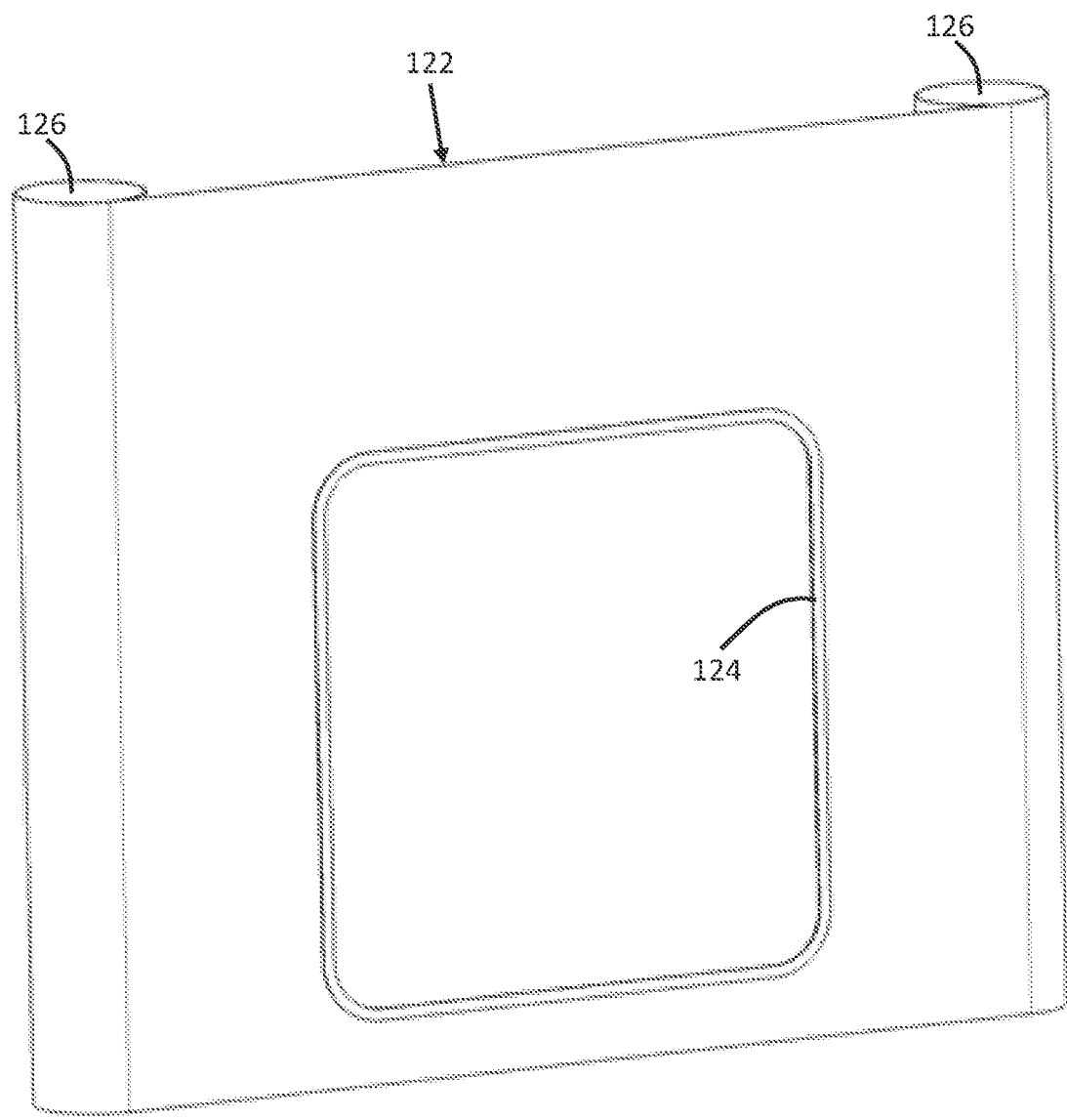
FIG. 19 shows a perspective view of the second sheet in accordance with some embodiments of the present disclosure.

FIGS. 16-18 show a seventh transportable enclosure 220 in accordance with some embodiments of the present disclosure. The seventh transportable enclosure 220 may be similar or identical to the sixth transportable enclosure 120 and/or one or more of the other transportable enclosures 20a, 20b, 20c, 20d, 20e of the present disclosure, with the addition of a second sheet 122. The second sheet 122 has a non-closed configuration, consisting of an elongated panel, similar to a scroll, which is configured to be moved horizontally into position to selectively cover or uncover the access position for providing access to the interior space. The second sheet 122 may have another orientation or configuration, other than as shown in the Figures. For example, the second sheet 122 may be configured to be moved vertically or in another direction. The second sheet 122 may be disposed inside of or outside of the housing 40 of the seventh transportable enclosure 220.

The second sheet 122 defines a second opening 124 therethrough for providing access to load or unload cargo from the interior space 23 when both the second opening 124 of the second sheet 122 and the first opening 24 of the first sheet 22 are aligned with the access position. Similarly to the other embodiments, the access position may correspond with an alignment with a port 48 in the enclosure 40 and/or with an internal structure within the interior space 23, such as a dispensing rack or an internal door.

The second sheet 122 may be made of fabric, such as a natural, synthetic or a hybrid of natural and synthetic materials. The second opening 124 may be generally rectangular, with rounded corners as shown in the Figures. However, the second opening 124 may have any shape and/or size. The shape and/or size of the second opening 124 may depend on the size and/or shape of the cargo items to be loaded and/or unloaded therethrough. The Figures show the second sheet 122 with a single second opening 124, although it could include any number of second opening 124, such as a single second opening 124 or two or more second openings 124.

As shown in FIGS. 16-18, the second sheet 122 is configured to be rolled-up into roller covers 130 on either side of the housing 40. The roller covers 130 may partially or fully enclose rollers 126 that are configured to hold the second sheet 122 and to move the second sheet 122 in a linear fashion such that the second opening 124 selectively covers or uncovers the access position. The rollers 126 may be driven by the actuator 26, such that the second sheet 122 moves together with the first sheet 22. For example, a linkage (not shown in the Figures) may mechanically couple the rollers 126 to rotate when the closed loop of the first sheet 22 is rotated. Alternatively, the rollers 126 may be mechanically independent of the first sheet 22. For example, a second, independent actuator (not shown in the Figures) may be used to rotate the rollers 126 in order to move the second sheet 122. Such independent operation may provide enhanced security.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transportable enclosure comprising:
   a sheet of flexible material defining a closed loop surrounding an interior space, the sheet defining an opening therethrough;
   an actuator disposed within the transportable enclosure and configured to rotate the closed loop of the sheet for selectively aligning the opening with an access position for loading or unloading cargo from the interior space through the opening; and
   a second sheet configured as an elongated panel and defining a second opening, wherein the second sheet is configured to be moved to cause the second opening to selectively uncover the access portion.

2. A transportable enclosure comprising:
   a sheet of flexible material defining a closed loop surrounding an interior space, the sheet defining an opening therethrough, the closed loop of the sheet configured to be rotated for selectively aligning the opening with an access position for loading or unloading cargo from the interior space through the opening;
a housing including a panel defining a port, the port defining the access position for providing access to the interior space of the transportable enclosure; and
a second sheet configured as an elongated panel and defining a second opening, wherein the second sheet is configured to be moved to cause the second opening to selectively uncover the access portion.

3. The transportable enclosure of claim 2, wherein the housing is disposed around the sheet and outside of the closed loop of the sheet.

4. The transportable enclosure of claim 2, wherein the housing defines a drive aperture configured to receive an external drive wheel from outside of the transportable enclosure for rotating the closed loop of the sheet.

5. The transportable enclosure of claim 2, wherein the housing defines a driver opening aligned with a pulley configured to rotate with the sheet, the pulley including a tool feature for being driven to rotate by an external tool inserted through the driver opening.

6. The transportable enclosure of claim 2, further including at least one roller located outside of the housing and configured to hold the second sheet.

7. A delivery vehicle comprising:
an autonomous vehicle base having a plurality of wheels and defining one or more enclosure docks;
a plurality of transportable enclosures each configured to removably attach to an enclosure dock of the one or more enclosure docks, each transportable enclosure of the plurality of transportable enclosures defining an interior space;
a plurality of rotary doors, each rotary door including a sheet of flexible material defining a closed loop and having an opening therethrough; and
an actuator configured to rotate the closed loop of the sheet of flexible material for selectively aligning the opening with an access position for loading or unloading cargo from a corresponding interior space of the plurality of transportable enclosures and through the opening.

8. The delivery vehicle of claim 7, wherein the actuator is disposed within the at least one transportable enclosure of the plurality of transportable enclosures.

9. The delivery vehicle of claim 7, wherein the actuator is disposed within the autonomous vehicle base.

10. The delivery vehicle of claim 7, further comprising: a drive pulley disposed within the least one transportable enclosure and coupled to the actuator to be driven to rotate by the actuator; and
a belt extending along the closed loop and configured to engage the drive pulley for rotating the closed loop of the sheet of flexible material.

11. The delivery vehicle of claim 10, wherein the belt is disposed along a peripheral edge of the sheet of flexible material.

12. The delivery vehicle of claim 7, further comprising an internal structure within the interior space, and wherein the internal structure defines the access position for providing access to the interior space.

13. The delivery vehicle of claim 7, further comprising: a housing including a panel defining a port, the port defining the access position for providing access to the interior space.

14. The delivery vehicle of claim 13, wherein the housing is disposed around the sheet of flexible material and outside of the closed loop of the sheet of flexible material.

15. The delivery vehicle of claim 13, wherein the housing defines a drive aperture configured to receive an external drive wheel from outside of the transportable enclosure for rotating the closed loop of the sheet of flexible material.

16. The delivery vehicle of claim 13, wherein the housing defines a driver opening aligned with a pulley configured to rotate with the sheet of flexible material, the pulley including a tool feature for being driven to rotate by an external tool inserted through the driver opening.

17. The delivery vehicle of claim 7, further comprising: a guide configured to hold the closed loop of the sheet of flexible material outwardly while allowing the closed loop of the sheet of flexible material to rotate.

18. The delivery vehicle of claim 17, wherein the guide comprises at least one of: a guide pulley configured to roll as the closed loop of the sheet of flexible material is rotated, or an extended portion configured to hold the closed loop of the sheet of flexible material outwardly while allowing the closed loop of the sheet of flexible material to slide therealong.

19. The delivery vehicle of claim 7, wherein the opening comprises a plurality of two or more openings.

20. The delivery vehicle of claim 7, wherein the delivery vehicle is configured to simultaneously hold two or more transportable enclosures of the plurality of transportable enclosures.

* * * * *